United States Patent

Yumoto

[11] Patent Number: 5,833,135
[45] Date of Patent: Nov. 10, 1998

[54] THERMALLY-ACTUATED STEAM TRAP

[75] Inventor: Hideaki Yumoto, Kakogawa, Japan

[73] Assignee: TLV Co., Ltd., Kakogawa, Japan

[21] Appl. No.: 226,521

[22] Filed: Apr. 12, 1994

[30] Foreign Application Priority Data

Apr. 15, 1993 [JP] Japan .................................. 5-113635

[51] Int. Cl.$^6$ ........................................... F16T 1/10
[52] U.S. Cl. .................................... 236/58; 236/93 A
[58] Field of Search ................ 236/56, 58, 93 A, 236/99 J

[56] References Cited

U.S. PATENT DOCUMENTS

| | | | |
|---|---|---|---|
| 1,109,705 | 9/1914 | Serrell | 236/58 |
| 1,572,970 | 2/1926 | Stalker | 236/58 X |
| 2,289,020 | 7/1942 | Jones | 236/58 |
| 4,161,278 | 7/1979 | Klann et al. | 236/56 |
| 4,244,518 | 1/1981 | Foller | 236/58 |
| 4,295,605 | 10/1981 | Clayton et al. | 236/56 |
| 4,681,256 | 7/1987 | Dewhirst | 236/56 |
| 4,955,536 | 9/1990 | Foller et al. | 236/48 R |
| 5,082,237 | 1/1992 | Ayvaz | 251/11 |
| 5,197,669 | 3/1993 | Yumoto | 236/58 |

FOREIGN PATENT DOCUMENTS

| | | |
|---|---|---|
| 0171464 | 2/1986 | European Pat. Off. . |
| 158892 | 3/1905 | Germany . |

*Primary Examiner*—William E. Tapolocai
*Attorney, Agent, or Firm*—Jordan and Hamburg

[57] ABSTRACT

A thermally-actuated steam trap comprises a valve casing having an inlet, a valve chest and an outlet. A valve seat member with a discharge passage is disposed between the valve chest and the outlet. A temperature control element with an expansible medium sealed therein is disposed within the valve chest, and consists of two disk-shaped wall members, at least one wave-like diaphragm member provided between the wall members, and a valve member secured to the diaphragm member. Displacement of the diaphragm accompanying the expansion and contraction of the expansible medium causes the valve member to come into and out of a seating engagement with the valve seat member to close and open the discharge passage. In order to avoid a state of producing a permanent deformation of the diaphragm of low elastic material and not to be affected by repeated use of the diaphragm, the upper surface of the lower disk-shaped wall member has a curved region corresponding to the wave form of the diaphragm member.

8 Claims, 3 Drawing Sheets

THERMALLY-ACTUATED STEAM TRAP

BACKGROUND OF THE INVENTION

The present invention relates to a steam trap for automatically discharging condensate generated in various kinds of steam using equipment and steam pipe lines, and, more particularly, to a thermally-actuated steam trap adapted to discharge the condensate below a desired temperature out of a system by using a temperature control element including a medium which is heated and expanded by steam and cooled and contracted by condensate.

Such a thermally-actuated steam trap is provided with a body having therein a valve chest in which steam or condensate is introduced and a temperature control element disposed in the valve chest. The temperature control element used for such a steam trap comprises two disk-like wall members, an upper one and a lower one, and at least one diaphragm provided between the two wall members, the diaphragm being secured at its outer peripheral edge to both the wall members, and the inner space formed between the upper wall member and diaphragm accomodating an expansible medium which changes in volume corresponding to the temperature. Further, on the diaphragm at the side opposite the expansible medium side is carried a valve member.

In the thermally-actuated steam trap having such a temperature control element disposed in the valve chest, an inflow of steam at a high temperature in the valve chest causes the expansible medium to expand, thereby displacing the diaphragm in the direction of closing the valve, so that the valve member carried by the diaphragm is brought into a seating engagement with the valve seat member connected to the outlet, and accordingly, a discharge passage formed in the valve seat member is closed. This prevents the discharge of steam. On the other hand, an inflow of condensate at a low temprature in the valve chest causes the expansible medium to contract, thereby displacing the diaphragm in the direction of opening the valve, so that the valve member is brought out of a seating engagement with the valve seat member to open the discharge passage, thereby discharging the condensate out of the system.

In the thermally-actuated steam trap as constructed above, since the valve member secured to the diaphragm is displaced in response to a change in the volume of the expansible medium to perform the opening and closing operations of the valve, the part damaged most easily as the time of use proceeds is the diaphragm.

As the diaphragm deforms accompanying the expansion and contraction of the expansible medium, if the diaphragm is flat, it should deform with the expansion and contraction of its material per se. However, the diaphragm is usually formed of material such as metal or the like poor in elasticity, and such a flat configuration makes the deformation of the diaphragm difficult even if the expansion and contraction of the expansible medium occur; therefore, that the amount of displacement of the valve member secured to the diaphragm may be in sufficient for the opening and closing operations of the valve, from the viewpoint of prevention of the leakage of steam as well as the good discharge of condensate.

Therefore, contouring the diaphragm like a wave has hitherto been widely performed. For example, U.S. Pat. No. 1,109,705
U.S. Pat. No. 4,295,605
U.S. Pat. No. 4,681,256
U.S. Pat. No. 4,955,536
U.S. Pat. No. 5,082,237
U.S. Pat. No. 5,197,669
EP-A-0 171 464 and
German Patent No. 158892 each show a wave-like diaphragm in a drawing without depending upon its relation to the technical content proposed therein. Contouring the diaphragm like a wave as noted above makes the portions of the wave in question extend and contract in response to the expansion and contraction of the expansible medium to thereby displace the valve member to a relatively great extent.

However, while the diaphragm can be relatively easy to deform to thereby perform the opening and closing operations of the valve, in the case where the expansible medium further excessively expands after the valve member comes into a seating engagement with the valve seat member, the portions of the wave completely extend so that a permanent deformation occurs in the diaphragm poor in elasticity and the form of the wave can not be fully restored, thereby impairing the property of responding to the heat of the steam trap.

SUMMARY OF THE INVENTION

It is an object of the present invent ion to provide a thermally-actuated steam trap, which avoids a situation where a permanent deformation is caused in the diaphragm of a low elastic material and which is not affected by repeated use of the diaphragm.

It is a further object of the invention to provide a thermally-actuated steam trap which can avoid application of a useless load to the diaphragm and which is, therefore, capable of sufficiently maintaining the life of endurance of the diaphragm.

In order to achieve the above-mentioned objects, according to the invention, there is provided a thermally-actuated steam trap comprising:

a valve casing having an inlet, a valve chest and an outlet;

a valve seat member disposed between the valve chest and the outlet and having a discharge passage;

a temperature control element disposed within the valve chest and including (i) two disk-shaped wall members, an upper one and a lower one, (ii) at least one wave-like diaphragm member provided between the wall members, and (iii) a valve member secured to said diaphragm member;

the lower disk-shaped wall member having an upper surface having a curved region corresponding to the configuration of the wave of the diaphragm member;

the temperature control element having an expansible medium sealed therein, whereby displacement of the diaphragm member accompanying the expansion and contraction of the expansible medium causes the valve member to come into and out of a seating engagement with the valve seat member, therby opening and closing the discharge passage.

Preferably, an elastic member for pressing the temperature control element toward the valve seat member is incorporated.

BRIEF DESCRIPTION OF THE DRAWINGS

The above and other objects and features of the invention will become more apparent upon reading the following description and drawings, in which.

DESCRIPTION OF PREFERRED EMBODIMENT

The present invention will now be explained by way of an embodiment.

Figure 1:
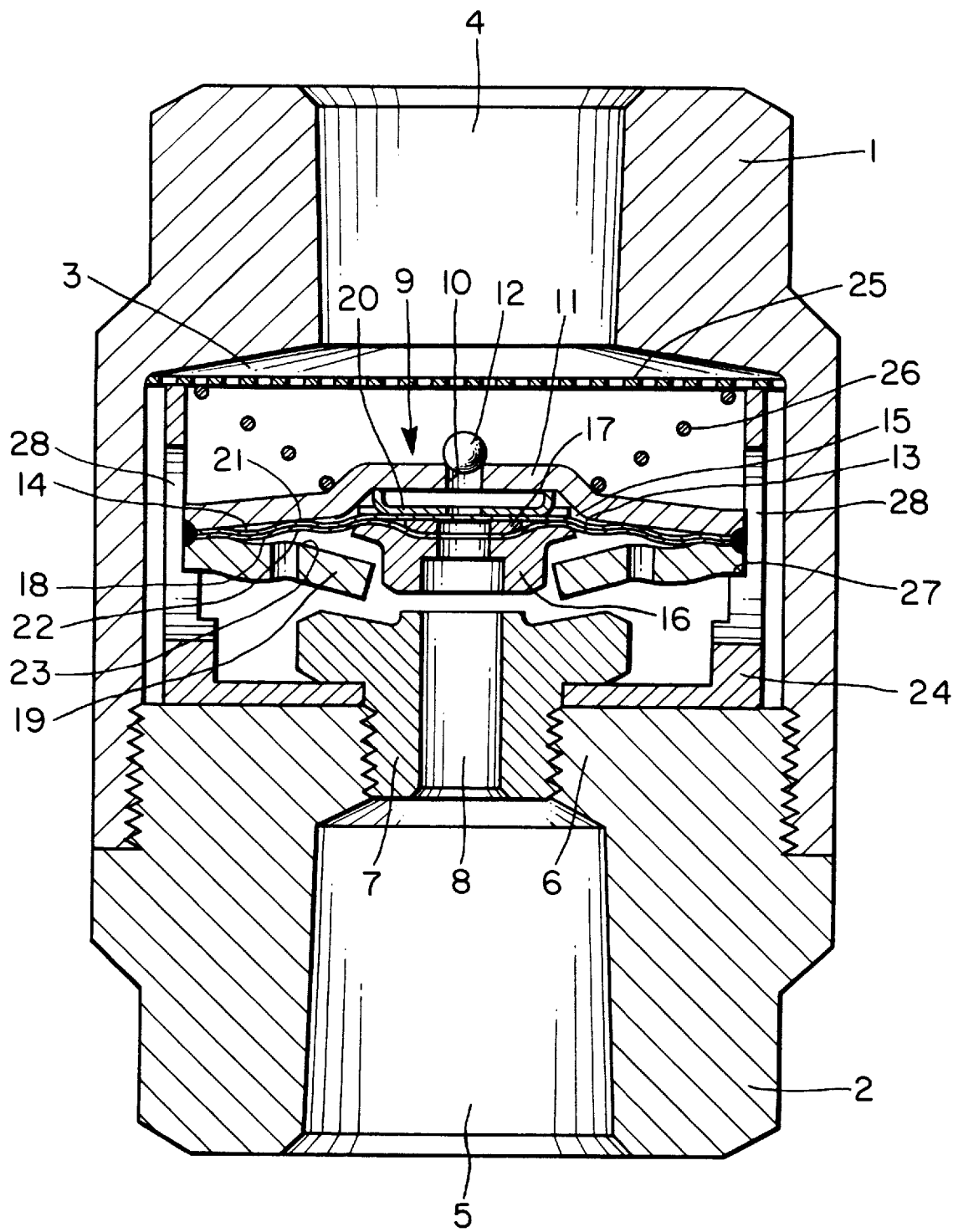
FIG. 1 is a sectional view of a thermally-actuated steam trap of an embodiment according to the invention, showing the valve being opened.

Referring to FIG. 1, an upper casing 1 and a lower casing 2 are threadably connected with each other to form a valve casing having a valve chest 3 therein. The upper casing 1 and the lower casing 2 are formed with an inlet 4 and an outlet 5, respectively.

A partition wall 6, between the valve chest 3 and the outlet 5, is threadably connected a valve seat member 7. In the middle of the valve seat member 7 is provided a penetrating discharge passage 8 communicating the valve chest 3 with the outlet 5.

A temperature control element 9 is accomodated within a fitting member 24 in the form of a bottomed cylinder held at the inner periphery of the bottom thereof between the partition wall 6 and the valve seat member 7 so that the temperature control element 9 is positioned upwardly of the valve seat member 7. On the peripheral wall of the fitting member 24 are provided a plurality of windows 28 for allowing condensate to flow. The temperature control element 9 comprises an upper wall member 11, a first diaphragm 14, an expansible medium 15, a valve member 16, a second diaphragm 18 held between the valve member 16 and a separate annular member 17, and a lower wall member 19 provided with a center hole in which the valve member 16 can enter.

The expansible medium 15 is poured from a pouring port 10 of the upper wall member 11 into the accomodating chamber 13 formed by the upper wall member 11 and the first diaphragm 14, and the pouring port 10 is covered and sealed with a plug member 12. The expansible member 15 consists of water or a liquid having a boiling point lower than water or a mixture thereof.

The valve member 16 comes into and out of a seating engagement with the valve seat member 7 to open and close the discharge passage 8. The outer peripheral walls of both the first diaphragm 14 and second diaphragm 18 are sandwiched between the upper wall member 11 and lower wall member 19 and secured thereto. In the middle region of the lower surface of the upper wall member 11 is secured a stopper 20 which serves to limit the displacement of the diaphragms 14 and 18 due to contraction of the expansible medium 15.

As can be understood from FIG. 1, the first diaphragm 14 has the contour of a ripple having a plurality of concentric circular annular projections 21. The second diaphragm 18 also has the contour of a ripple having a plurality of concentric circular annular projections 22.

Figure 2:
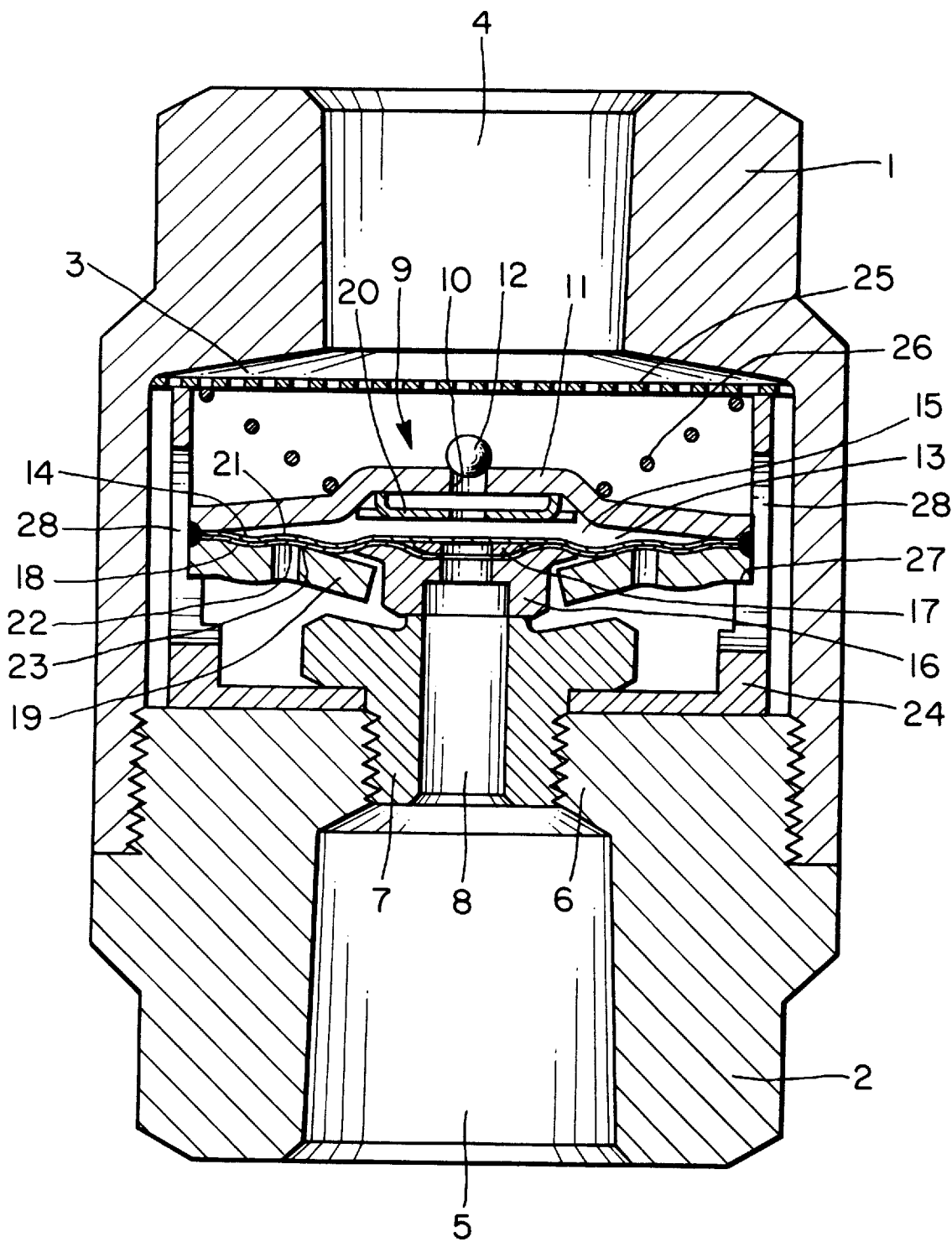
FIG. 2 is a sectional view of the steam trap corresponding to FIG. 1, showing a the valve being closed.

The surface of the lower wall member 19, with which the lower surface of the second diaphragm comes into an abutting engagement, is curved so that it substantially coincides with the wave form of the second diaphragm when the valve member 16 comes into a seating engagement with the valve seat member 7, as shown in FIG. 2, and is formed with concentric circular annular projections 23. The number of the annular projections formed on the diaphragms may be only one. It is sufficient if only the upper surface of the lower wall member is curved so as to extend along the form of the lower surface of the diaphragm.

Between a filter screen 25, which is held between the upper casing 1 and the fitting member 24, and the upper wall member 11 of the temperature control member 9 is disposed a conical coil spring 26 which biases the temperature control element 9 downward, so that the lower surface of the lower wall member 19 is brought into pressure contact with the stepped portion 27 formed on the inner surface of the fitting member 24.

In operation, in the case where the fluid, which flows from the inlet 4 into the valve chest 3, is condensate at a low temperature, the extensible medium 15 contracts, and, in addition to that, the pressure of the fluid within the valve chest 3 is applied to the diaphragm, so that, as shown in FIG. 1, the diaphragms 14 and 18 are lifted and the valve member 16 is brought out of a seating engagement with the valve seat member 7, thereby opening the discharge passage 8. Thus, condensate is discharged from the outlet 5.

Figure 3:
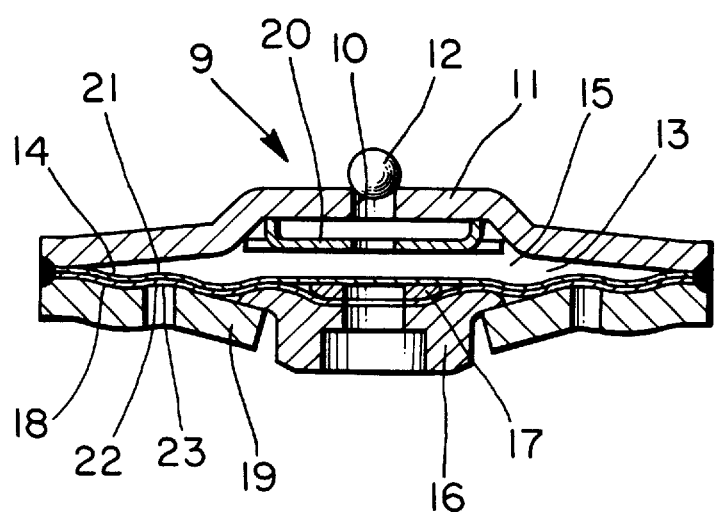
FIG. 3 is a sectional view of a temperature control element showing diaphragms and a lower wall member, in an overheated and expanded condition, in close contact with each other.

When the temperature within the valve chest 3 rises due to steam at a high temperature after the discharge of the condensate of fluid at a low temperature, the expansible medium 15 expands, and, as shown in FIG. 2, the valve member 16 is brought into a seating engagement with the valve seat member 7 through the first and second diaphragms 14 and 18 to close the discharge passage 8, thereby preventing the outflow of steam. When the valve member 16 comes into a seating engagement with the valve seat member 7, there is a slight clearance between the lower surface of the second diaphragm 18 and the upper surface of the lower wall member 19; however, when the expansible medium 15 further expands (a state of overheating), the temperature control element 9 is displaced upwardly within the fitting member 24 against the biasing force of the coil spring 26, so that, as shown in FIG. 3, the lower surface of the second diaphragm 18 and the upper surface of the lower wall member 19 are substantially brought into close contact with each other.

What is claimed is:

1. A thermally-actuated steam trap comprising:
    a valve casing having an inlet, a valve chest and an outlet;
    a valve seat member disposed between said valve chest and said outlet and having a discharge passage;
    a temperature control element disposed within said valve chest, said temperature control element including:
        upper and lower wall members fixed to each other about peripheries thereof to form a rind control element structure and spaced apart from each other at areas inside said peripheries to define diaphragm cavity;
        at least one diaphragm member, having a wave configuration, fixed at a periphery thereof between said peripheries of said upper and lower wall members and displaceable therebetween within said diaphragm cavity;
    an expansible medium, expandable in response to temperature increase and sealed between said diaphragm member and said upper wall member, said expansible medium effecting displacement of said diaphragm member towards and away from said valve seat member and said lower wall member in respective valve closing and opening modes by respective expansion and contraction of said expansible medium; and
    a valve member secured to said diaphragm member for seated engagement with said valve seat during said valve closing mode; and said lower wall member having a rigid upper surface with a curved region corresponding to the wave configuration of said diaphragm member disposed to restrict said diaphragm member from movement at areas displaced into supported contact with said rigid upper surface, in response to excessive expansion of said expansible medium, beyond an amount sufficient to bring said valve member into said seated engagement with said valve seat member to prevent permanent deformation of said wave configuration of said diaphragm member by engagement with said curved region corresponding to said wave configuration.

2. The thermally-actuated steam trap according to claim 1, further comprising an elastic member for pressing said temperature control element toward said valve seat member.

3. A thermally-actuated steam trap comprising:

a valve casing having an inlet, a valve chest and an outlet;

a valve seat member disposed between said valve chest and said outlet and having a discharge passage;

a temperature control element disposed within said valve chest, said temperature control element including:

upper and lower wall members fixed to each other about peripheries thereof to form a rigid control element structure and spaced apart from each other at areas inside said peripheries to define a diaphragm cavity;

at least one diaphragm member, having a wave configuration, fixed at a periphery thereof between said peripheries of said upper and lower wall members and displaceable therebetween within said diaphragm cavity;

an expansible medium, expandable in response to temperature increase and sealed between said diaphragm member and said upper wall member, said expansible medium effecting displacement of said diaphragm member towards and away from said valve seat member and said lower wall member in respective valve closing and opening modes by respective expansion and contraction of said expansible medium; and a valve member secured to said diaphragm member for seated engagement with said valve seat during said valve closing mode;

said lower wall member having a rigid upper surface with a curved region corresponding to the wave configuration of said diaphragm member disposed to restrict said diaphragm member from movement at areas displaced into supported contact with said rigid upper surface, in response to excessive expansion of said expansible medium, beyond an amount sufficient to bring said valve member into said seated engagement with said valve seat member to prevent permanent deformation of said wave configuration of said diaphragm member by engagement with said curved region corresponding to said wave configuration;

said temperature control element being slidably disposed in said valve casing permitting movement towards and away from said valve seat member, between respective first and second positions whereat said valve member is engaged with said valve seat member and movement of said diaphragm between first and second states of expansion effects movement of said control element between said first and second positions;

biasing means for biasing said temperature control element towards said valve seat member;

said diaphragm member being partially spaced apart from and partially supported at said areas by said upper surface of said lower wall member when in said first position; and said diaphragm member being brought into fully supporting contact with said upper surface of said lower wall member by a movement of said temperature control element caused by a continued excessive expansion of said expansible medium beyond said amount sufficient to bring said valve member into said seated engagement with said valve seat member.

4. The thermally-actuated steam trap according to claim 3, further comprising:

stop means for preventing continued movement of said temperature control element further away from said valve seat than said second position.

5. A thermally-actuated steam trap, comprising:

a valve casing having an inlet a valve chest and an outlet;

a valve seat member disposed between said valve chest and said outlet and having a discharge passage;

a temperature control element disposed within said valve chest, said temperature control, element including:

upper and lower wall members fixed to each other about peripheries thereof to form a rigid control element structure and spaced apart from each other at areas inside said peripheries to define a diaphragm cavity;

at least one diaphragm member, having a wave configuration, fixed at a periphery thereof between said peripheries of said upper and lower wall members and displaceable therebetween within said diaphragm cavity;

an expansible medium, expandable in response to temperature increase and sealed between said diaphragm member and said upper wall member, said expansible medium effecting displacement of said diaphragm member towards and away from said valve seat member and said lower wall member in respective valve closing and opening modes by respective expansion and contraction of said expansible medium; and a valve member secured to said diaphragm member for seated engagement with said valve seat during said valve closing mode;

said lower wall member having a rigid upper surface with a curved region corresponding to the wave configuration of said diaphragm member disposed to restrict said diaphragm member from movement at areas displaced into supported contact with said rigid upper surface, in response to excessive expansion of said expansible medium, beyond an amount sufficient to bring said valve member into said seated engagement with said valve seat member to prevent permanent deformation of said wave configuration of said diaphragm member by engagement with said curved region corresponding to said wave configuration;

said temperature control element being slidably disposed in said valve casing permitting movement towards and away from said valve seat member, between respective first and second position whereat said valve member is engaged with said valve seat member and movement of said diaphragm between first and second states of expansion effects movement of said control element between said first and second positions:

biasing means for biasing said temperature control element towards said valve seat member;

said diaphragm member being partially spaced apart from and partially supported at said areas by said upper surface of said lower wall member when in said first position;

said diaphragm member being brought into fully supporting contact with said upper surface of said lower wall member by a movement of said temperature control element caused by a continued excessive expansion of said expansible medium beyond said amount sufficient to bring said valve member into said seated engagement with said valve seat member;

stop means for preventing continued movement of said temperature control element further away from said valve seat than said second position;

said valve member protruding through a central aperture provided in said lower wall member; and said stop means including a shoulder portion peripherally disposed on said valve member, said shoulder portion having at outer diameter larger than an inner diameter of said central aperture to halt the movement of said lower wall member away from said valve seat member, opposing said biasing means, when said lower wall member contacts said shoulder as said temperature control member is moved into said second position.

6. A thermally-actuated steam trap comprising:

a valve casing having an inlet, a valve chest and an outlet;

a valve seat member disposed between said valve chest and said outlet and having a discharge passage;

a temperature control element disposed within said valve chest, said temperature control element including:
  upper and lower wail members fixed to each other about peripheries thereof to form a rigid control element structure and spaced apart from each other at areas inside said peripheries to define a diaphragm cavity;
  at least one diaphragm member fixed at a periphery thereof between said peripheries of said upper and lower wall members and displaceable therebetween within said diaphragm cavity;
  an expandable medium, expandable in response to temperature increase and sealed between said diaphragm member and said upper wall member, said expandable medium effecting displacement of said diaphragm member towards and away from said valve seat member and said lower wall member in respective valve closing and opening modes by respective expansion and contraction of said expandable medium; and
  a valve member secured to said diaphragm member for seated engagement with said valve seat during said valve closing mode;

said lower wail member having a rigid upper surface disposed to restrict said diaphragm member from movement at areas displaced into supported contact with said rigid upper surface, in response to excessive expansion of said expandable medium, beyond an amount sufficient to bring said valve member into said seated engagement with said valve seat member to prevent permanent deformation of said diaphragm member;

said temperature control element being slidably disposed in said valve casing permitting movement towards and away from said valve seat member, between respective first and second positions whereat said valve member is engaged with said valve seat member and movement of said diaphragm between first and second states of expansion effects movement of said control element between said first and second positions;

biasing means for biasing said temperature control element towards said valve seat member;

said diaphragm member being partially spaced apart from and partially supported at said areas by said upper surface of said lower wall member when in said first position; and said diaphragm member being brought into fully supporting contact with said upper surface of said lower wall member by a movement of said temperature control element caused by a continued excessive expansion of said expandable medium beyond said amount sufficient to bring said valve member into said seated engagement with said valve seat member.

7. The thermally-actuated steam trap according to claim 6, further comprising stop means for preventing continued movement of said temperature control element further away from said valve seat than said second position.

8. The thermally-actuated steam trap according to claim 7, wherein:

said valve member protrudes through a central aperture provided in said lower wall member; and said stop means includes a shoulder portion peripherally disposed on said valve member, said shoulder portion having an outer diameter larger than an inner diameter of said central aperture to halt the movement of said lower wall member away from said valve seat member, opposing said biasing means, when said lower wall member contacts said shoulder as said temperature control member is moved into said second position.

* * * * *